US 6,622,083 B1

(12) United States Patent
Knockeart et al.

(10) Patent No.: US 6,622,083 B1
(45) Date of Patent: Sep. 16, 2003

(54) PORTABLE DRIVER INFORMATION DEVICE (75) Inventors: Ronald P. Knockeart, Clarkston, MI (US); Robert L. Drury, Novi, MI (US); Melvin A. Rode, Orion, MI (US); Harry Asher, Garden City, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/585,384

(22) Filed: Jun. 1, 2000

Related U.S. Application Data
(60) Provisional application No. 60/137,216, filed on Jun. 1, 1999, provisional application No. 60/140,880, filed on Jun. 24, 1999, provisional application No. 60/145,284, filed on Jul. 23, 1999, and provisional application No. 60/166,787, filed on Nov. 22, 1999.

(51) Int. Cl.⁷ .................................................. B60Q 1/00
(52) U.S. Cl. ........................... 701/202; 701/35; 705/6; 709/203
(58) Field of Search .................. 701/202, 35; 709/203; 705/6

(56) References Cited

U.S. PATENT DOCUMENTS

| | | | |
|---|---|---|---|
| 4,258,421 A | * 3/1981 | Juhasz et al. ................. 701/35 |
| 4,733,356 A |   3/1988 | Haeussermann et al. |
| 5,239,700 A |   8/1993 | Guenther et al. |
| 5,278,759 A | * 1/1994 | Berra et al. ............. 364/424.01 |
| 5,515,284 A | * 5/1996 | Abe ........................... 364/444 |
| 5,559,707 A | * 9/1996 | DeLorme et al. ........... 364/443 |
| 5,581,462 A | * 12/1996 | Rogers ................. 364/424.012 |
| 5,648,768 A | * 7/1997 | Bouve ........................ 340/988 |
| 5,648,769 A | * 7/1997 | Sato et al. .................. 340/988 |
| 5,781,871 A | * 7/1998 | Mezger et al. .............. 455/456 |
| 5,794,164 A | * 8/1998 | Beckert et al. ................ 701/1 |
| 5,802,492 A | * 9/1998 | DeLorme et al. ........... 701/200 |
| 5,859,628 A | * 1/1999 | Ross et al. .................... 345/173 |
| 5,862,500 A | * 1/1999 | Goodwin ...................... 701/35 |
| 5,922,040 A | * 7/1999 | Prabhakaran ............... 340/990 |
| 5,922,041 A | * 7/1999 | Anderson ................... 701/200 |
| 5,924,075 A | * 7/1999 | Kanemitsu ..................... 705/6 |
| 5,938,721 A | * 8/1999 | Dussell et al. .............. 701/211 |
| 5,944,768 A | * 8/1999 | Ito et al. ...................... 701/200 |
| 5,948,040 A | * 9/1999 | DeLorme et al. ........... 701/201 |
| 5,950,144 A | * 9/1999 | Hall et al. ................... 702/108 |
| 5,951,620 A | * 9/1999 | Ahrens et al. .............. 701/200 |
| 5,959,577 A | * 9/1999 | Fan et al. ............... 342/357.13 |
| 6,009,403 A | * 12/1999 | Sato ............................... 705/6 |
| 6,018,775 A | * 1/2000 | Vossler .......................... 710/1 |
| 6,032,089 A | * 2/2000 | Buckley ...................... 701/36 |
| 6,041,281 A | * 3/2000 | Nimura et al. .............. 701/211 |
| 6,073,063 A | * 6/2000 | Leong Ong et al. .......... 701/35 |
| 6,075,467 A | * 6/2000 | Ninagawa .................. 340/995 |
| 6,076,041 A | * 6/2000 | Watanabe ................... 701/211 |
| 6,115,655 A | * 9/2000 | Keith et al. .................... 701/35 |

(List continued on next page.)

FOREIGN PATENT DOCUMENTS

| | | |
|---|---|---|
| DE | 198 24 587 | 12/1998 |
| FR | 2761387 | 10/1998 |
| FR | 2761788 | 10/1998 |

OTHER PUBLICATIONS

Patent Abstracts of Japan, vol. 1998, No. 14, Dec. 31, 1998, JP 10 260047 A, Matsushita Electric Ind. Co. Ltd.

*Primary Examiner*—Michael J. Zanelli
*Assistant Examiner*—Eric M Gibson (57) ABSTRACT

A system and method for making use of a removable device, such as a PDA, cellphone or similar device, in conjunction with a driver information system. The removable device is brought to a vehicle and data in the removable device is transferred to the vehicle. This data can be data that is normally stored in the removable device, such as contact data, or it can be data that the operator has selected and loaded into the removable device for transport to the vehicle, for instance to update the vehicle information system. Data can also be transferred from the vehicle to external systems by transporting it in the removable device.

32 Claims, 8 Drawing Sheets

U.S. PATENT DOCUMENTS

| | | | | |
|---|---|---|---|---|
| 6,121,924 A | * | 9/2000 | Meek et al. | 340/995 |
| 6,127,947 A | * | 10/2000 | Uchida et al. | 340/999 |
| 6,141,609 A | * | 10/2000 | Herdeg et al. | 701/35 |
| 6,181,992 B1 | * | 1/2001 | Gurne et al. | 701/29 |
| 6,181,994 B1 | * | 1/2001 | Colson et al. | 701/33 |
| 6,182,006 B1 | * | 1/2001 | Meek | 340/988 |
| 6,216,086 B1 | * | 4/2001 | Seymour et al. | 701/202 |
| 6,249,767 B1 | * | 6/2001 | Okayama et al. | 705/5 |
| 6,334,089 B2 | * | 12/2001 | Hessing | 701/209 |

* cited by examiner

PORTABLE DRIVER INFORMATION DEVICE

CROSS-REFERENCE TO RELATED APPLICATIONS

This application claims the benefit of U.S. Provisional Application Nos. 60/137,216 filed Jun. 1, 1999, No. 60/140,880 filed Jun. 24, 1999, No. 60/145,284 filed Jul. 23, 1999, and No. 60/166,787 filed Nov. 22, 1999, which are each incorporated herein by reference.

BACKGROUND

This invention relates to a portable device used with a driver information system.

Driver information systems, such as systems which provide route planning and guidance services to an operator of a vehicle, typically function in an autonomous manner using data stored in the vehicle or make use of a centralized server that the vehicle contacts over a wireless communication link such as using road-side beacons, a cellular telephone connection, an FM sideband channel, or a pager. Updating autonomous systems often requires replacement of its storage, such as replacing a CD-ROM. In systems that communicate with a centralized server, the amount of data that can be loaded into a vehicle is limited by the data rate of the wireless communication link with the centralized server.

Many people today make use of personal digital assistants (PDAs), which are small often general-purpose computers that are used to execute productivity applications and store data, such as personal contact databases. An owner of a PDA, who also makes use of a driver information system, may at times want to make use of guidance services of the driver information system to reach a location related to a record in the contact database in his or her PDA.

SUMMARY

In a general aspect, the invention is a method for making use of a removable device, such as a PDA, cellphone or similar device, in conjunction with a driver information system. The removable device is brought to a vehicle and data in the removable device is transferred to the vehicle. This data can be data that is normally stored in the removable device, such as contact data, or it can be data that the operator has selected and loaded into the removable device for transport to the vehicle, for instance to update the vehicle information system. Data can also be transferred from the vehicle to external systems by transporting it in the removable device.

In one aspect, in general, the invention is a method for providing information to a driver information system in a vehicle. The method includes selecting information on an information source and then transferring the selected information onto a storage medium in a portable device. The portable device is then transported to the vehicle and communication is established between the portable device and the driver information system. The method then includes transferring the information from the storage medium in the portable device to the driver information system.

The method can include one or more of the following features.

Selecting the information includes selecting location-related information.

Selecting the location-related information includes specifying an itinerary.

Specifying the itinerary includes specifying a final destination.

Specifying the itinerary includes specifying one or more intermediate destinations.

Selecting the location-related information includes selecting road-map data related to the specified itinerary.

Selecting the location-related information includes selecting locations of points of interest related to the specified itinerary.

Selecting locations of points of interest includes identifying a class of points of interest.

Selecting the location-related information includes selecting advertising information Selecting information on the information source includes providing a user profile and subsequently matching the information on the information source using the user profile.

The method further includes establishing a communication path over a public data network from the portable device to the information source, and transferring the selected information onto the storage medium includes transferring the selected information over the established communication path.

Establishing the communication path over the public data network includes establishing a communication path over a public Internet.

Transferring the information from the storage medium in the portable device to the driver information system includes transferring said information over a wireless data link.

The driver information system includes a docking station and transporting the portable device to the vehicle includes docking the portable device in the docking station.

In another aspect, in general, the invention is a method for vehicle navigation. The method includes coupling a portable device to an on-board computer. The portable device includes a storage device for holding travel-related information. A specification of a destination is accepted from a user. Travel-related information, including information related to the specified destination, is transferred from the portable device to the on-board computer. The method then includes guiding the user along a route to the specified destination.

The method can include one or more of the following features.

A graphical display on the portable device is controlled from the on-board computer.

Visual feedback is provided to the user while accepting the specification of the destination.

Visual feedback is provided while guiding the user along the route to the specified destination.

Accepting the specification of the destination includes accessing a database stored on the portable device.

Accessing the database stored on the portable device includes accessing address information in a personal contact database.

In another aspect, in general, the invention is a method for updating a driver information system in a vehicle. A portable device is coupled to an information source, and information from the information source is transferred to a storage device in the portable device. The portable device is transported to the vehicle and coupled to the driver information system. The driver information system is then updated using the information in the storage device in the portable device.

The method can include the feature that the storage device in the portable device has a limited capacity and the steps are repeated multiple times. The driver information system is thereby updated using a greater amount of information than can be stored in the portable device at one time.

In another aspect, in general, the invention is a method for retrieving data from a driver information system in a vehicle. The method includes coupling a portable device to the driver information system and transferring the data from the driver information system to a storage device in the portable device. The portable device is then transported from the vehicle to a destination of the data and the portable device is coupled to the destination of the data. The data is then transferred from the portable device to the destination of the data.

The transferred data can be vehicle diagnostic data.

The transferred data can be travel-related data

In another aspect, in general, the invention is a driver information system. The system includes an on-board computer, and a communication interface for removably coupling a portable device to the on-board computer. The on-board computer is programmed to access information stored in the portable device that is coupled to the on-board computer through the communication interface.

The system can include one or more of the following features.

The communication interface includes a wireless communication interface for communicating between the portable device and the on-board computer over a wireless communication channel.

The on-board computer is further programmed to display information on said portable device, and to accept user inputs from said portable device.

The on-board computer is further programmed to access navigation-related information on the portable device in response to user inputs for selecting a travel destination The communication interface includes a mechanical docking station for accepting the portable device.

The communication interface includes configurable circuitry for adapting to communication with the portable device.

The mechanical docking station includes an adjustable portion for adapting to the portable device.

The invention has one or more of the following advantages:

Making use of data that is normally stored in an operator's PDA allows an operator to easily specify a destination that corresponds to a contact record stored in the PDA.

Using the storage functionality of the removable device provides an efficient means of updating data in the vehicle without relying on limited data rate wireless connections.

The data transferred to the vehicle in the removable device can be personalized for the particular operator, and to a particular itinerary planned by the operator.

Other features and advantages of the invention will be apparent from the following description, and from the claims.

DESCRIPTION

Figure 1:
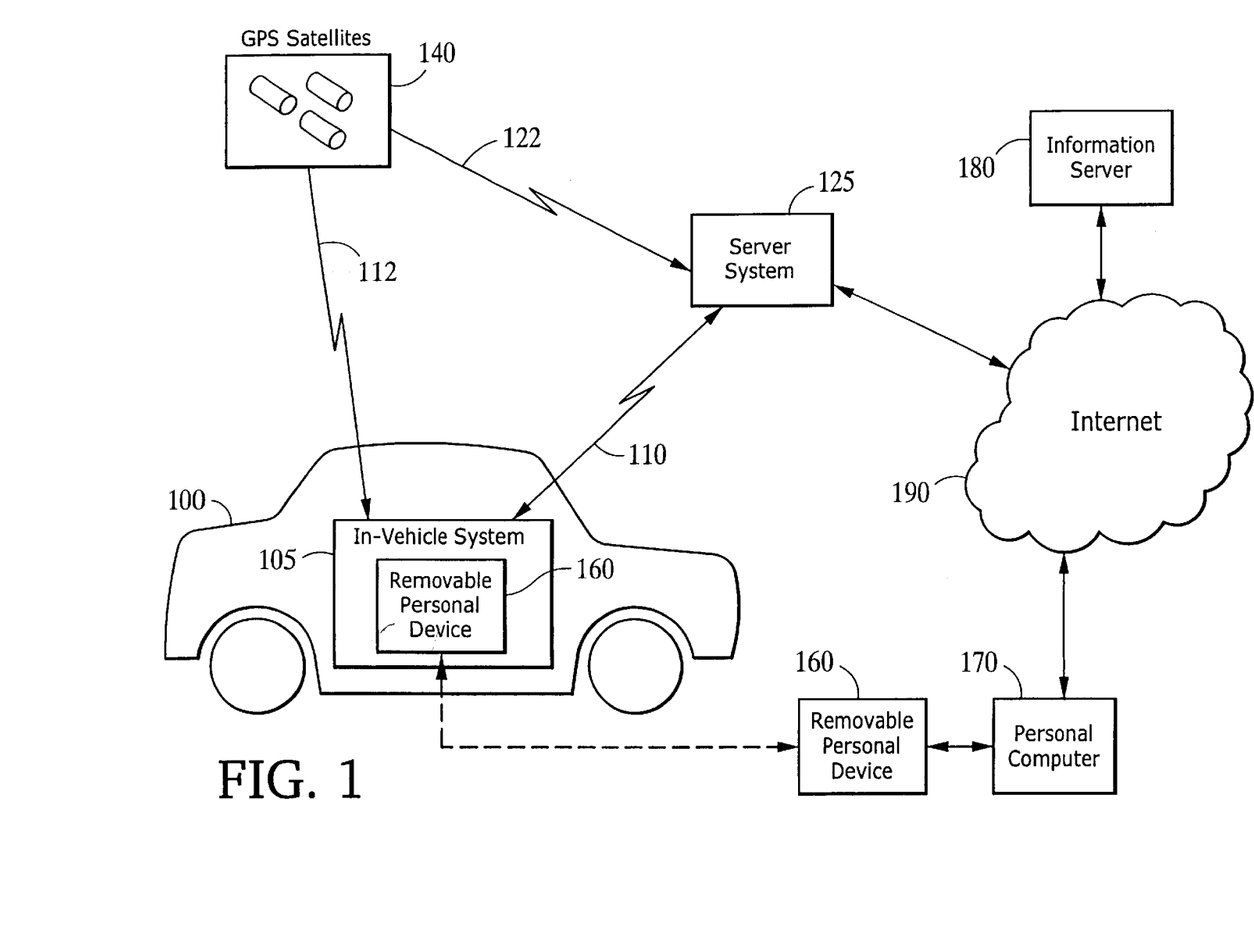
FIG. 1 is a block diagram of the vehicle information system.

Referring to FIG. 1, a driver information system provides route planning and guidance ("navigation") services to the operators of multiple vehicles 100, which are free to drive throughout a wide geographic area. To provide these services to the operators of vehicles 100, the vehicle information system performs some functions in a server system 125 that is at a fixed location, and other functions in in-vehicle systems 105 installed in each vehicle 100. Each in-vehicle system 105 on occasion communicates with server system 125 over a wireless communication link 110. The system also makes use of signals from global positioning system (GPS) satellites 140 to estimate the locations of vehicles 100 for instance in terms of their latitudes and longitudes.

In-vehicle system 105 is configured to use a removable personal device 160 to provide certain functionality of the in-vehicle system, or to enhance functionality of components of the in-vehicle system that are permanently affixed to the vehicle. In this description, a "removable" device is understood to be a device that is intended to be brought in and out of the vehicle by the operator of the vehicle and coupled to the in-vehicle system in some manner that provide a communication path between the in-vehicle system and the removable personal device. Other components of the system are "permanently" affixed to the vehicle in that they are not generally brought in and out of the vehicle. Such items that could, however, be installed or removed for extended periods of time. Equipment installed after a vehicle leaves an auto factory may be permanent, even if it is an "after-market" product that could be removed from the vehicle.

In various embodiments, removable personal device 160 provides an input/output interface between in-vehicle system 105 and an operator of the vehicle, or alternatively augments input/output capability supported by permanently installed devices in the vehicle. For instance, in some of the embodiments, removable personal device 160 includes a graphical display and that display is used to provide visual information to the operator of the vehicle during the route planning and guidance phases of navigation. The removable device may also include buttons or a touch-screen that is used by the operator for manual input to the system. In some embodiments, the in-vehicle system may include a graphical output device that is affixed to the vehicle, for example a shared console display, and the removable personal device is used to augment that display. Similarly in some embodiments the in-vehicle system has fixed manual controls, such as buttons on the console or steering wheel, which are used as an alternative to buttons on the removable personal device.

In various embodiments, removable personal device 160 includes a storage device, such as a magnetic disk or a non-volatile memory, that is accessed by other components of the in-vehicle system. In certain of the embodiments in which removable personal device 160 includes such a storage device, that storage device is used to carry navigation-related data between the vehicle and a personal computer 170 to either "download" or "upload" information to or from the vehicle, respectively. In some of these embodiments, the data that is downloaded to the vehicle is loaded into removable personal device 160 from a personal computer 170 that is coupled to Internet 190. This allows data to be obtained from an information server 180 over the Internet by the personal computer and loaded into the removable personal device for transport to the vehicle. Similarly, data that is uploaded from the vehicle can be passed to the personal computer and then to the information server. In alternative embodiments, removable personal device 160 may be coupled to the information server in other ways, such as by connecting directly to the Internet over a wireless or telephone-based link, or by connecting directly to an information server without communicating over the Internet.

In various embodiments, the vehicle information system uses one of a number of alternative approaches to route planning and guidance. Some of these approaches generally involve (a) destination selection at in-vehicle system 105, (b) transmitting the selected route to server system 125 over wireless communication link 110, (c) route planning at server system 125, (d) downloading of route information from server system 125 to in-vehicle system 105 over wireless communication link 110, followed by (e) route guidance of the vehicle under the control of in-vehicle system 105 without necessarily communicating with server system 125. Such approaches are described in a co-pending U.S. applications Ser. No. 09/252,432, "Driver Information System," filed Feb. 18, 1999. That co-pending application is incorporated herein by reference. In other embodiments, the vehicle information system is entirely autonomous in its navigation functions, or makes use of server system 125 during the route guidance phase of navigation.

Figure 2:
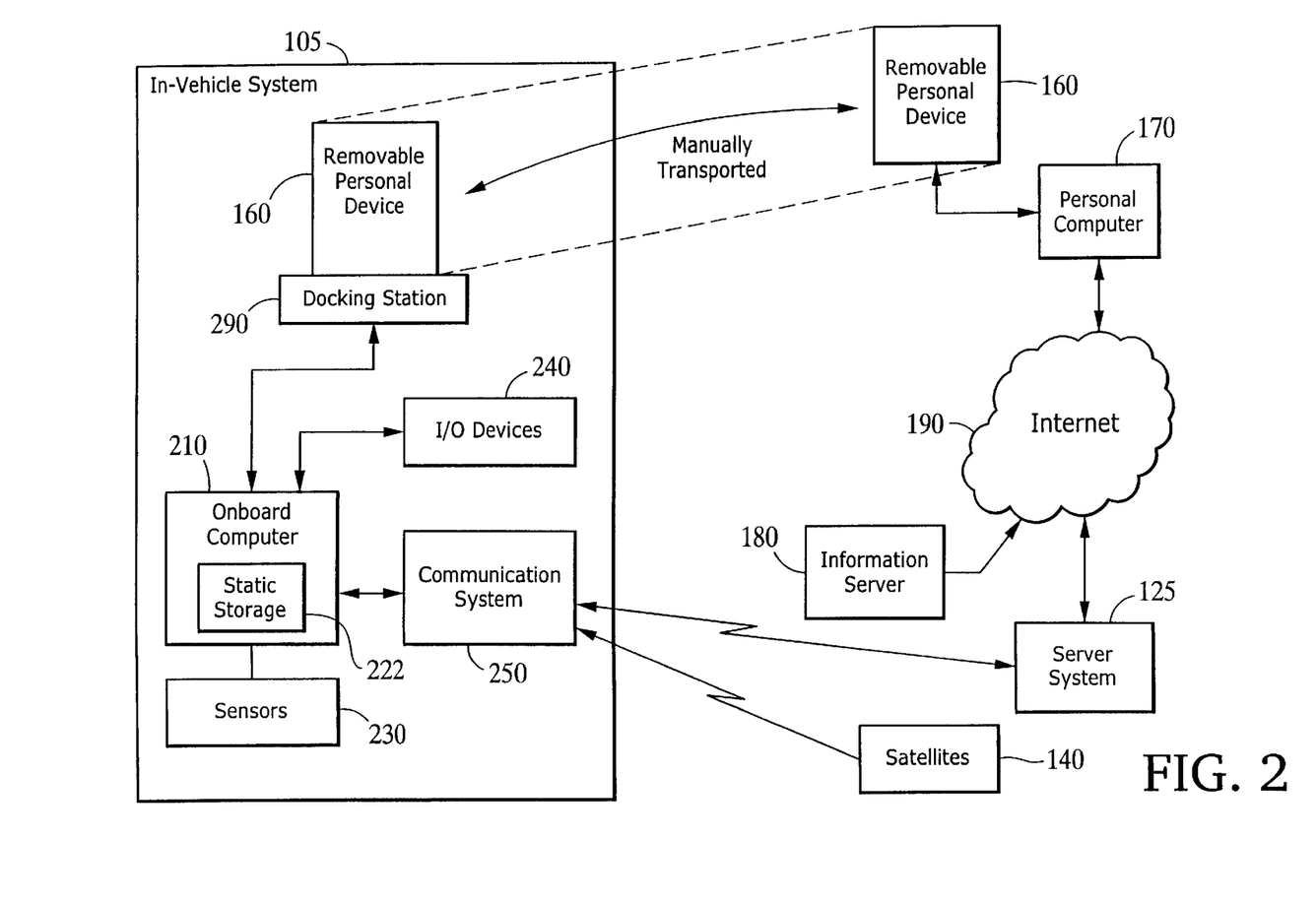
FIG. 2 is a block diagram of components of an in-vehicle system.

Referring to FIG. 2, in a first embodiment, in-vehicle system 105 is one of a type described in the "Driver Information System" patent application referenced above. In-vehicle system 105 includes an on-board computer 210 which is used to coordinate the operation of other components, including sensors 230, which provide information related to the motion of the vehicle, input/output (I/O) devices 240, which provide an interface between the operator of the vehicle and the navigation system, and communication system 250, which provides communication links from GPS satellites 140 and to and from server system 125.

In this embodiment, on-board computer 210 has limited storage and processing capabilities. Or-board computer 210 includes a processor that is coupled to other components of the on-board computer. The other components include a static storage 222 which is a non-volatile storage used to store code and data for operation of the system. In particular, as is described further below, static storage 222 is used to store map-related information, such as a main roads network, which is used during route guidance procedures executed on on-board computer 210. Static storage 222 can alternatively be a magnetic disk, an optical disk, or a solid state storage device such as a flash memory. In certain embodiments, the static storage includes a removable medium, such as a removable optical disk.

Sensors 230, which provide information related to the motion of the vehicle, include one or more of a velocity or distance sensor, a differential velocity sensor that provides the relative speed of the wheels on either side of the vehicle thereby encoding a turning radius of the vehicle, a magnetic compass, a gyroscope, and accelerometers. In other embodiments, no sensors 230 are used, and the system relies on positioning information derived from GPS satellites 140, or from some other positioning system (e.g., roadside beacons, cellular telephone cells, etc.).

I/O devices 240 provide an interface for input from the operator of the vehicle. In this embodiment, I/O devices 240 includes a manual input device, such as a knob, push-button, or rocker switch that is permanently affixed to the vehicle in a convenient location such as on the steering wheel or console. In alternative, alternative manual input devices are used, such as a small keyboard, and in some embodiments, no manual input device is permanently affixed to the vehicle and input is either provided through the removable personal device or through some non-manual input mode. In alternative embodiments, I/O devices 240 include an automatic speech recognition device that allows an operator to provide spoken input to the system.

I/O devices 240 also provide an interface for output to the operator of the vehicle. In this embodiment, I/O devices 240 does not include a graphical display, although in alternative embodiments such a display may be used to provide graphical output in addition to or instead of that which can be provided to the operator using the removable personal device.

Referring still to FIG. 2, in-vehicle system provides a way of coupling removable personal device 160 to on-board computer 210. In this embodiment, this includes a docking station 290, which mechanically holds the removable personal device in place, for example, in a location on the dashboard of the vehicle that is accessible to the operator of the vehicle. The docking station also provides a communication path between the removable personal device and the on-board computer. Docking station 290 is discussed further below with reference to FIG. 5.

Figure 3:
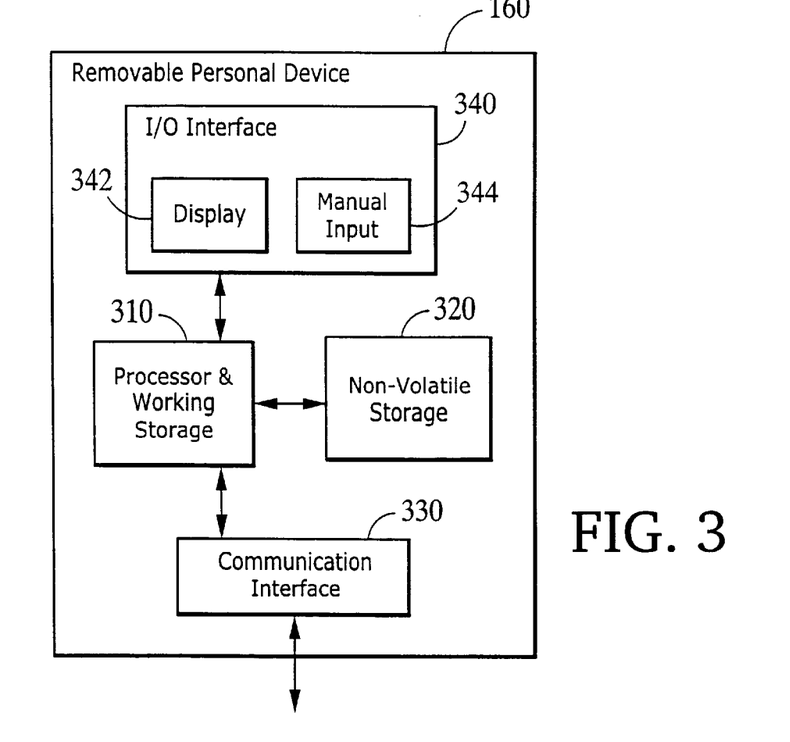
FIG. 3 is a block diagram of components of a removable personal device.
Figure 4:
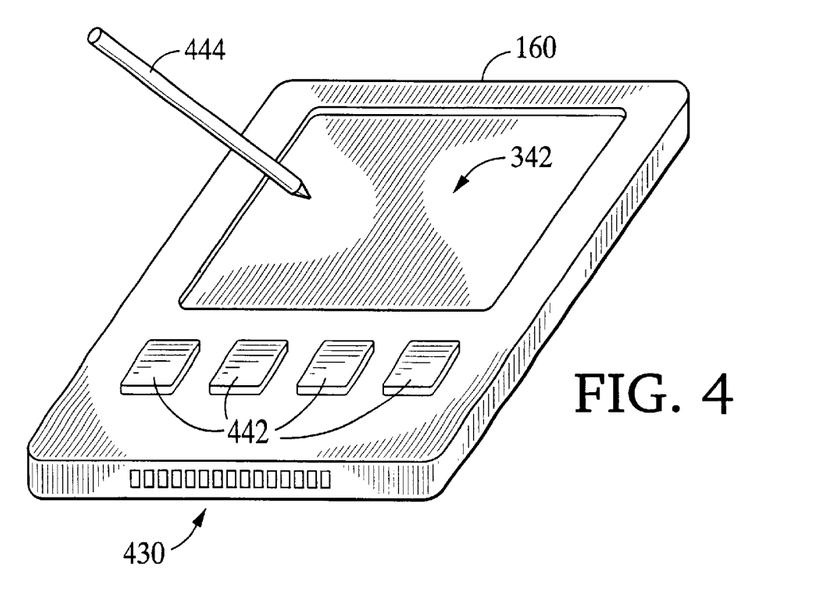
FIG. 4 is an illustration of the removable personal device.

Referring to FIGS. 3 and 4, in this embodiment, removable personal device 160 is a portable computer, which is commonly referred to as a "personal digital assistant" or PDA. In this particular embodiment, removable personal device 160 is Palm Computer made by Palm Inc., which is a general-purpose computer on which any of a number of different software applications can be executed under the control of an operating system. In other embodiments, PDAs made by other manufactures are alternatively used. Similarly, other personal computers, such as those commonly referred to as "laptop" computers can alternatively be used, although the larger physical size of laptop computers may limit the locations in which they can be docked in a vehicle. Referring to FIG. 3, removable personal device 160 includes a processor and working storage 310, and a non-volatile storage 320 coupled to the processor. An I/O interface 340 is coupled to the processor. This interface includes a display 342, which provides bitmapped graphical output, and a manual input system 344. Referring to FIG. 4, manual input system 344 includes a number of push buttons 442, as well as a stylus 444, which is used to "write" on the surface of display 342. Removable personal device 160 also includes a communication interface 330 that provides a data path from the processor and working storage to external systems, such as a personal computer or, according to this invention, to the on-board computer. Referring to FIG. 4, communication interface is coupled to a series of connectors 430 that are used to establish electrical connections between the removable personal device and the external systems.

In alternative embodiments, communication between removable personal device 160 and the on-board computer is not necessarily based on electrical connections. For instance, the removable personal device alternatively uses a wireless communication, such as an optical (e.g., infra-red) link, a radio link, or an ultrasonic link. One alternative radio link uses the "Bluetooth" standard, which uses a low-power spread-spectrum at approximately 2 GHz for passing packetized data between devices.

Figure 5:
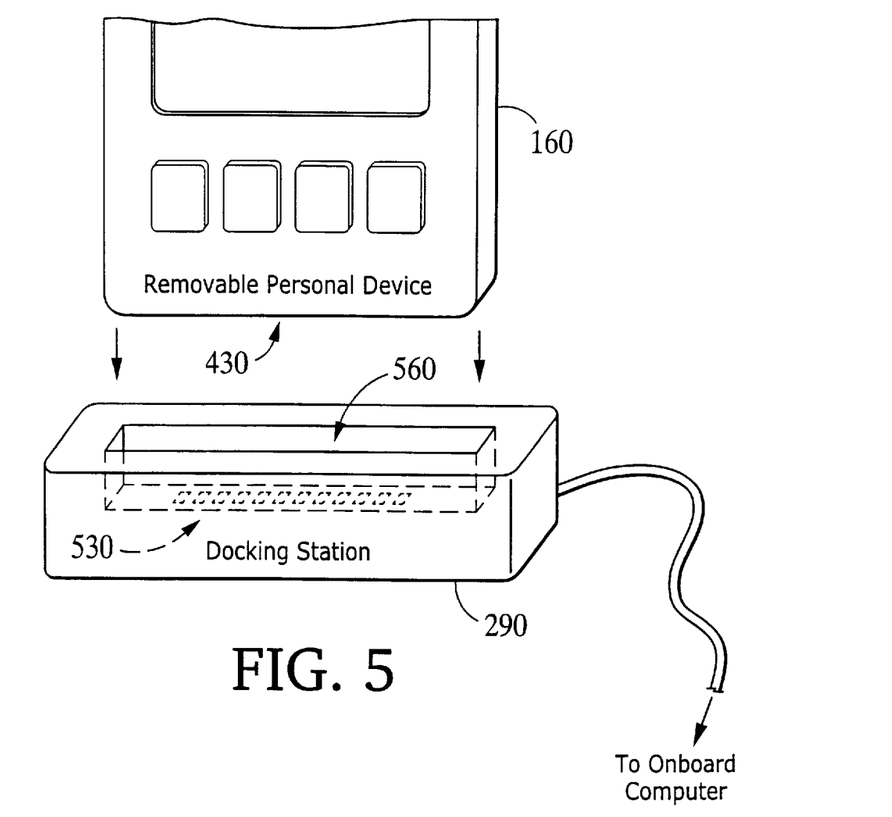
FIG. 5 is in illustration showing a docking station which accepts the removable personal device.

Referring to FIG. 5, docking station 290 (see FIG. 2) is affixed to the vehicle in a location such that the display of the removable personal device is visible to the vehicle's operator when it is docked in the docking station. In this embodiment, the docking station is on the dashboard of the vehicle, although a variety of alternative locations can be used. Docking station 290 provides a electrical signal path that couples it to the on-board computer over which data and commands are passed.

In this embodiment, docking station 290 is configured such that it has an opening 560 that matches the dimensions of removable personal device 160. In alternative embodiments, the docking station is mechanically adaptable to different devices which have different physical dimensions. This mechanical adaptation is accomplished using one of a variety of approaches, including using an adapter, or "shim", that mounts between a generic docking station and the particular device being used. Another alternative is using a mechanical approach that physically conforms to the removable device as it is inserted into the opening in the docking station.

Figure 6:
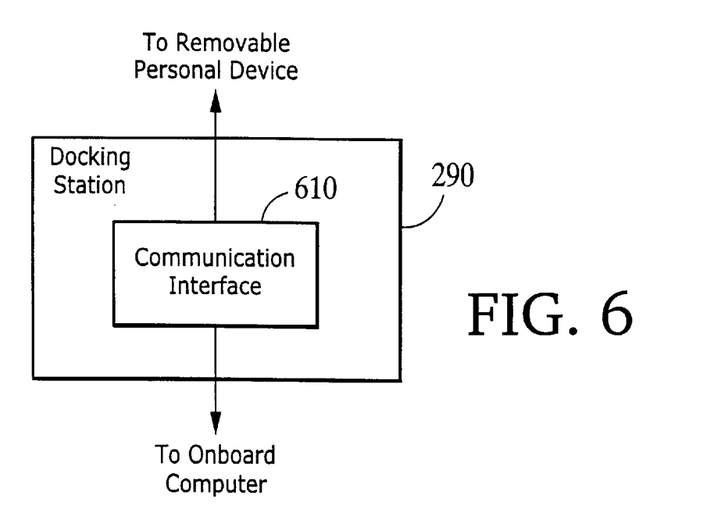
FIG. 6 is a block diagram of the docking station.

Referring to FIG. 6, docking station 290 includes a communication interface 610. Communication interface 610 is coupled to connectors 530 (FIG. 5) which mate with connectors 430 on removable personal device 160 when it is docked in the docking station. Communication interface 610 includes circuitry for passing signals between the docking station and the removable device. In some embodiments, the circuitry includes control circuitry, for instance, for sending a signal to the removable device when it is initially inserted into the docking station such that the signal initiates execution of particular software on the removable device when it is inserted.

In alternative embodiments in which docking station 290 is adaptable to different types of removable devices, communication interface 610 automatically adapts its electrical interface and communication protocols for communicating with the removable device depending on the type of removable device that is inserted into the docking station.

Figure 7:
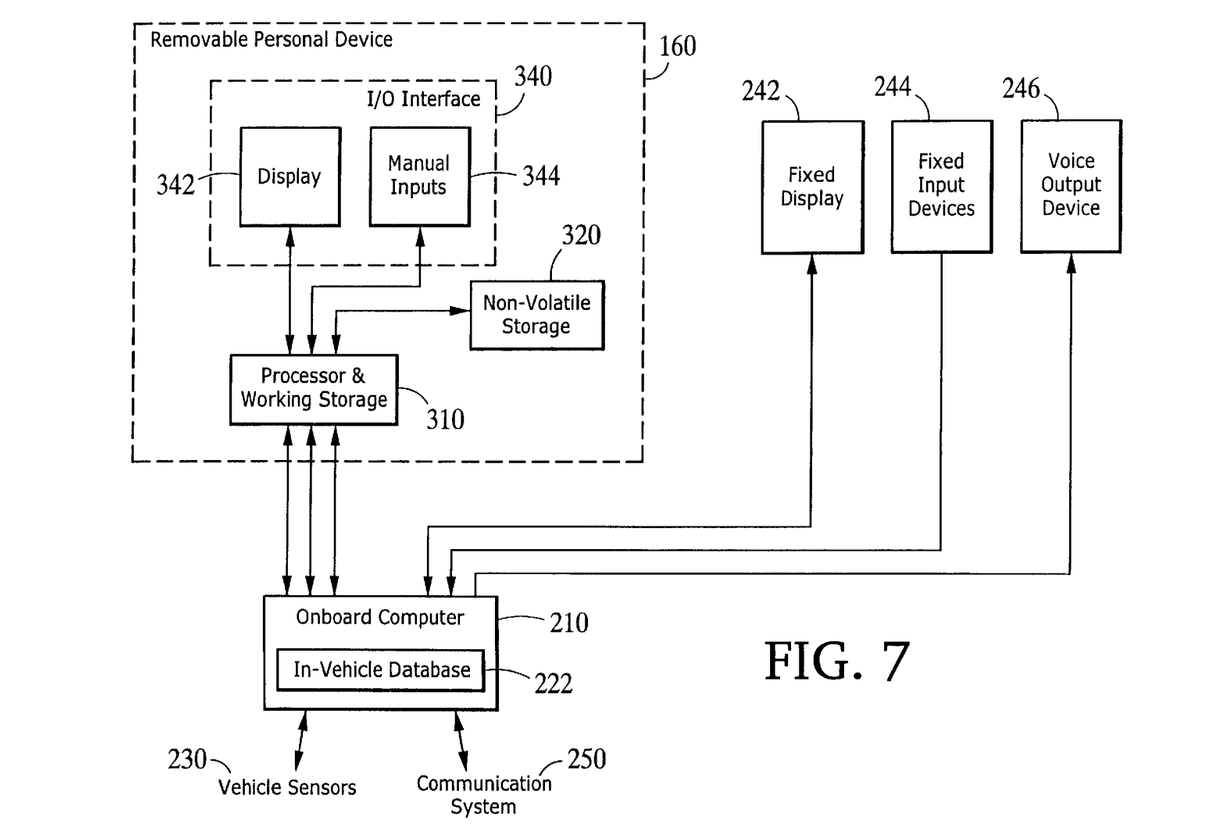
FIG. 7 is a block diagram of the removable personal device docked with an on-board computer.

Referring to FIG. 7, when removable personal device 160 is docked and coupled to on-board computer 210, display 342, manual inputs 344, and non-volatile storage 320 on the removable personal device are accessible to the on-board computer through processor 310 on the removable device. That is, an application executing on removable personal device 160 provides a software communication interface to the on-board computer such that devices such as display 342 and manual inputs 344 can be operated in a slave manner from the on-board computer. In this embodiment, when removable personal device 160 is inserted into docking station 290, the circuitry in the docking station sends a signal to the removable device that results the application starting on the removable device, using a hardware or software interrupt approach. On-board computer 210 is also coupled to fixed input devices 244, such as knobs or switches, and in some embodiments, to a fixed display 242 and a voice output device 246 which provides output in the form of prerecorded or synthesized spoken words and phrases.

Using arrangement shown in FIG. 7 a number of operating modes are used together, or alternatively alone or in other combinations. The operating modes include the following, which are described more fully below:

1. Control of I/O interface 340 by on-board computer 210;
2. Downloading of data from non-volatile storage 320 to on-board computer 210 when the removable device is first docked;
3. Selective access of data in non-volatile storage 320 by on-board computer 210; and
4. Uploading of data from on-board computer 210 to non-volatile storage 320.

In addition, when the removable personal device is not docked in the vehicle and is instead coupled to personal computer 170 (FIGS. 1 and 2), data is passed between the removable device and the personal computer in one of a number of operating modes, which include:

1. Selection of navigation-related data by the operator of the vehicle for downloading to the removable device;
2. Uploading of travel-related data from the removable personal device to the personal computer, for instance for automatic selection of navigation-related data for future uses of the navigation system; and
3. Downloading of data or program updates to the removable device for maintenance of the on-board computer.

In the first operating mode in which on-board computer 210 controls I/O interfaces 340 on the removable personal device, on-board computer 210 passes control and data signals through docking station 290 to processor 310 in the removable device. A software application executing on the removable device handles communication with the on-board computer and processes the commands and data it receives from the on-board computer to display information on display 342, or to accept manual inputs. In this embodiment in which removable personal device 160 is a Palm Computer, the software application executes under the supervision of the Palm OS operating system. Initially, when the Palm Computer is inserted in the docking station, the docking station automatically asserts a "hotsync" signal which causes the Palm Computer to execute a predetermined application that is designed to pass data between the Palm Computer and computers with which it is to "synchronize" data. In this embodiment, the predetermined application includes the functionality to process commands and data received from the on-board computer. The application executing on the removable device accepts relatively higher level commands from the on-board computer and translates these into relatively lower level I/O commands, in this embodiment, using system services provided by the Palm OS.

When on-board computer 210 executes a route guidance application and makes use of I/O interfaces 340 on the removable device, it displays traveler information screens on display 342, such as turn-by-turn and text instructions for route guidance, map and point-of-interest information, route-specific traffic information, or other text messages related to route guidance. Other applications in which the on-board computer makes use of I/O interfaces 340 include emergency and roadside assistance.

In the second operating mode, the removable device downloads data from non-volatile storage 320 to on-board computer 210 when the removable device is first docked. The types of data that the removable device downloads includes a first type of data that is normally resident on the removable device. This mode is similar to the synchronization of databases that is typically supported between PDAs and personal computers. Also, a second type of data is specifically loaded onto the removable device for downloading to the on-board computer.

The first type of data includes contact information that is stored on the removable device for the purpose of supporting contact management of communication applications. In a typical contact manager that executes on such a removable device, a contact database is stored in non-volatile storage 320. This database includes names, telephone numbers, and addresses for individuals or businesses. For instance, the Palm Computer supports standard contact manager applications, as well as provisions for maintaining synchronization between the database stored on the Palm Computer and a contact database that the operator maintains on a personal computer.

As a first step in route planning using the navigation system, the operator of the vehicle selects a destination, which is then transmitted to the server system where the server system computes a route. Approaches to selecting a destination include choosing a city names and a street name and number, and choosing a telephone number that the server system uses in a reverse telephone directory lookup to determine a destination address. By downloading a contact database to the on-board system, the on-board system supports a destination selection mode in which the operator chooses from the entries in the contact database that has been loaded onto the on-board computer.

The second type of data that is downloaded from the removable device includes data for updating the software and data in the on-board computer. In embodiments in which the on-board computer includes map data, that data must occasionally be updated because of changes in the road network, or to correct errors in previous versions of the map data. As is described further below, this map data is loaded onto the removable device when the removable device is coupled to a personal computer, which may be coupled to the Internet. In an alternative variation of this mode, the data is not transferred to update out-of-data software or data, but the data also augments data based on explicit or implicit selections by the operator. As is discussed further below, such data can include detailed information about routes typically traveled by the operator, or planned to be traveled in an upcoming trip.

In the third operating mode, data store in non-volatile storage 320 is not necessarily downloaded to the on-board computer when the removable device is docked. For instance, in the case that the removable device includes a contact database, the on-board computer accesses particular records or has the removable device perform particular queries during its operation (at "runtime"). In destination selection, rather than accessing already downloaded contact data, the on-board computer uses the contact database on the removable device as a remote database. A software application executes on the removable device to service database requests from the on-board computer in much the same way as a software application services I/O commands in an operating mode described above.

In an alternative variant of this third operating mode, rather than sending relatively low-level data access commands from the on-board computer to the removable device, a very high-level command, such as "have operator select a destination" is sent from the on-board computer to the removable device, and an application executing on the removable device selects a contact in the contact database based on input from the operator, and sends the resulting address or telephone number to the on-board computer only once the operator has selected a destination.

In the fourth operating mode, the on-board computer uploads data to the removable device. As one example of this operating mode, information regarding past travel of the vehicle is uploaded to the removable device. One use of this data is in selecting other travel-related data to download to the removable device for future trips. In one alternative, the travel-related data that is uploaded includes starting and ending locations of trips. Alternatively, routes followed by the vehicle are also uploaded. Another alternative type of information includes traveling speeds along different route segments. Use of this type of information in selecting travel information is described more fully below. Examples of use of this type of uploading functionality is to download more detailed information to the on-board system about features near the frequently traveled routes, such as more detailed roadway information in these areas, points of interest such as gas stations and restaurants in these regions, or targeted advertising that is relevant to travel within these regions.

Figure 8:
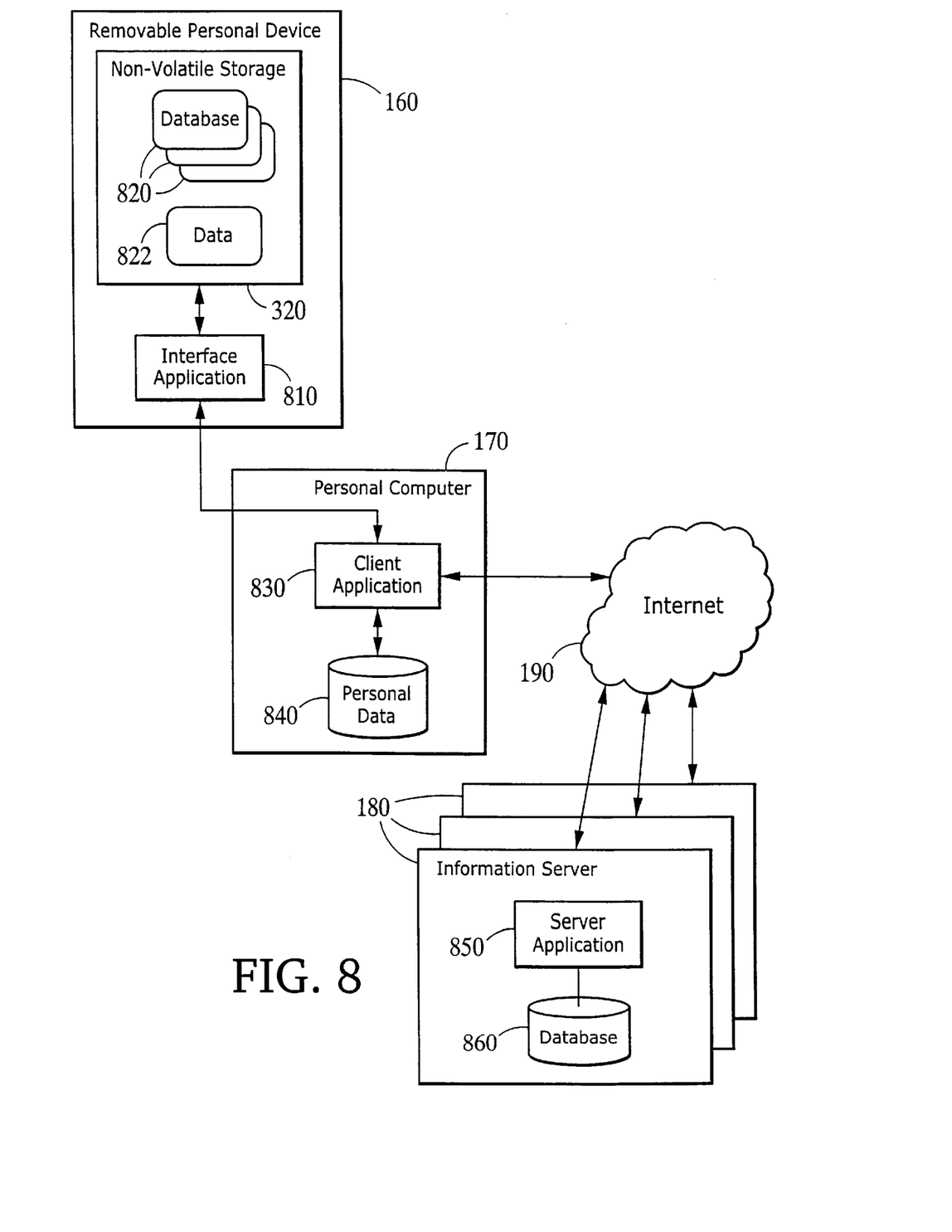
FIG. 8 is a block diagram of the removable personal device coupled to a personal computer that is on the Internet.

Referring to FIG. 8 we now turn to operating modes in which the removable device is coupled to personal computer 170. In FIG. 8, removable personal device 160 is shown coupled to personal computer 170. An interface application 810 executes on the removable device and communicates with a client application 830 on the personal computer. In this embodiment in which the removable personal device is a Palm Computer, interface application is started as a result of docking the Palm Computer in a standard docking station, which is coupled to the personal computer, and pressing a "hotsync" button on the docking station. Information stored in non-volatile storage 320 is logically arranged in one or more databases 820, such as a contact database with a record for each contact, or is arranged in a block of storage for data 822. On personal computer 170, client application 830 cooperates with interface application 810 to pass control information and data between the removable personal device and the personal computer.

In the first mode of operation when the removable personal device is coupled to the personal computer, the operator interacts with client application 830 to directly or indirectly select travel-related information to be loaded in the removable portable device for transport to the on-board computer. The client application can be a Web browser which interacts with a Web server application at another computer and the operator selects the information by controlling the interaction with the Web server. Alternatively, client application 830 is implemented using a series of applications, such as a Web browser and a separate downloading application for transferring data to the removable device. In one example of this first mode, the operator specifies an itinerary that consists of a starting location and an ending location, and optionally one or more intermediate locations. Based on this itinerary, client application selects and downloads travel-related information that is associated with the specified itinerary. Various types of such travel-related information may be selectively downloaded. Points of interest (POIs) can downloaded based solely on the itinerary. Optionally, the operator may specify classes of POIs that are of interest to him or her. For example, the operator may select gas stations operated by a particular oil company, restaurants in a certain price range or which serve particular types of food, hotels, museums, airports, etc. Alternatively, the operator may select POIs that correspond to yellow pages directory listings within a geographic area. The operator specifies these preferences at the time that the itinerary is specified. Alternatively, the operator has previously specified preferences as part of a user profile that is stored and retrieved to select information to download to the vehicle:

Other types of travel-related information include detailed map data for the region in the vicinity of the itinerary. Providing such map data can be used by the on-board computer in recovering from deviations from a planned route by enabling the on-board the computer to replan the route using the detailed map data. Also, more detailed map data can enable to on-board computer to plan minor deviations from the planned route, for example to go to an intermediate location such as a gas station or hotel, without necessarily contacting server system 125. In one alternative, an actual planned route is downloaded to the removable device. However, in such an alternative, the on-board system may not benefit from realtime traffic data that is available to the server system in panning a route, but does benefit from not requiring contact with the server system in order to have at least some route from the starting to the ending locations, even if it may not be optimal in view of the then current traffic conditions.

Client application 830 executing on personal computer 170 communicates with a server application 850 on information server 180. Information server 180 includes a master database 860 that includes the information from which the operator selects the information related to his or her itinerary. In alternative embodiments, the data is stored on personal computer 170 directly, for example, on a CD-ROM based database.

In the second mode of operation, data is uploaded from removable device 160 to personal computer 170, and optionally passed on to information server 180. In the case of historical data that related to the routes traveled by the vehicle in previous trips, that data may be used locally on the personal computer as part of the step of selecting travel related information for future trips. For instance, an operator may commute daily from his home to work using one of a small number of routes. Based on the historical tracking of the travel along these routes, the client application can select POIs that are appropriate for these routes. This historical travel information can also be transferred to information server 180 where the data is aggregated with data from other operators to build up statistical data that may be useful for tasks such as route planning.

In the third mode of operation, data or program updates are downloaded from personal computer 170 to removable device 160 for maintenance of the on-board computer. These updates are then downloaded to the on-board computer when the removable device is docked in the vehicle. Updates may exceed the capacity of the removable device, in which case the on-board computer is updated in several trips, with only a portion of the available updates being transferred to the removable device each time.

Figure 9:
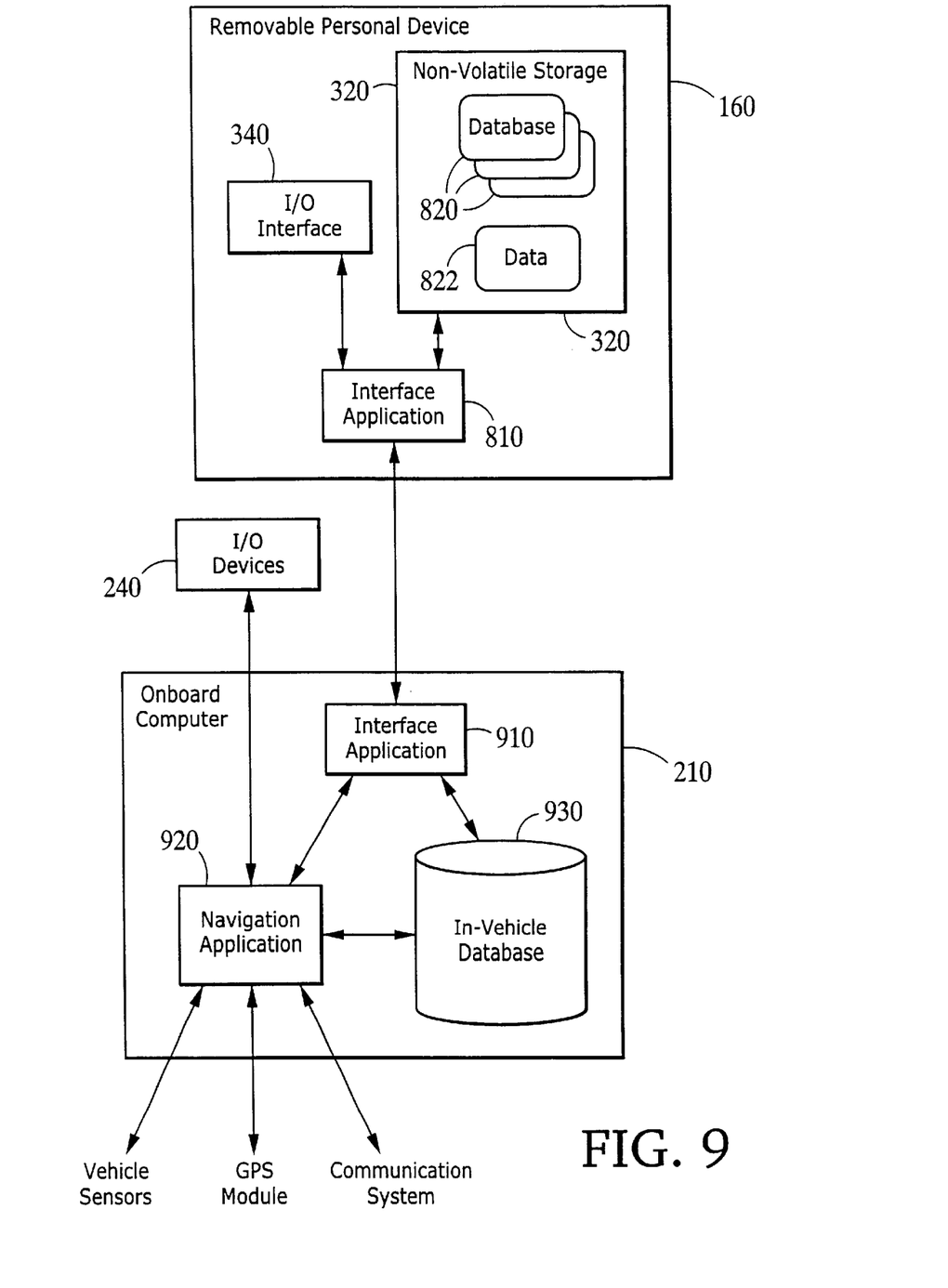
FIG. 9 is a block diagram of the removable personal device coupled to the on-board computer.

Referring to FIG. 9, when removable personal device 160 is subsequently coupled to on-board computer 210 through the docking station, an interface application 910 on the on-board computer communicates with interface application 810 that executes on the removable personal device. In-vehicle database 930, which is stored in static storage 222 (FIG. 2) of the on-board computer hold map data, POI data, and other travel-related information. In-vehicle database 930 is updated using information that is transferred from the removable device. In operating modes in which data is kept on the removable device and used at runtime by the on-board computer, interface application 910 executing on the on-board computer and interface application 810 executing on the removable device cooperate to pass control and data between them. On the on-board computer, a navigation application 920 coordinates communication with the removable device, and communication with the server system, GPS satellites, and vehicle sensors to perform route planning and route guidance functions.

In alternative embodiments, removable personal device 160 makes use of I/O devices 240 (FIG. 2), which are permanently affixed to the vehicle, to interface with applications executing on the removable personal device. For instance, rather than making use of stylus 444 (FIG. 4) or buttons 442 on the removable device, the application accepts operator input from I/O devices 240. In this way, input may be more convenient and less distracting than using the native input modes, such as stylus and button, available directly on the removable device. On-board computer executes a software application that communicates the manual inputs provided by the operator through I/O devices 240 to removable personal device 160. In one example of an application that executes on the removable device, a passenger in the vehicle uses I/O devices 240 for input to a game application. Alternatively an automatic speech recognizer executing on on-board computer 210 provides inputs to an application executing on the removable personal device.

Figure 10:
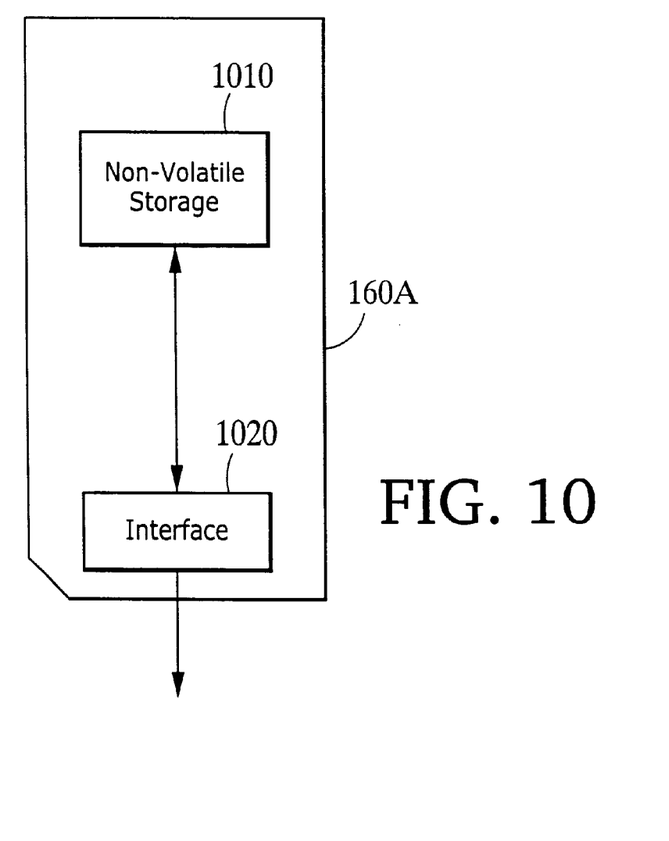
FIG. 10 is a block diagram of a removal memory device.
Figure 11:
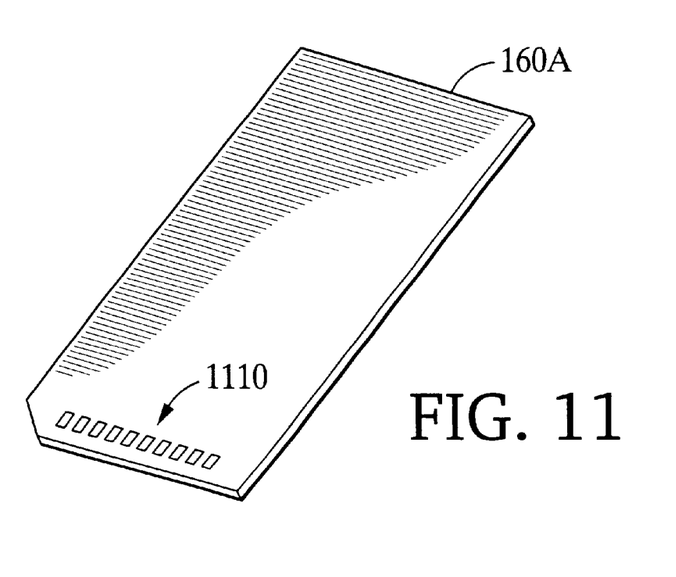
FIG. 11 is an illustration of the removable memory device.

In an alternative embodiment of the invention, the removable personal device is not a general-purpose computer, such as the Palm Computer, but rather is a storage device that does not necessarily have any user interface. Referring to FIG. 10, a removable personal device 160A includes a non-volatile storage 1010 and an interface 1020. Referring to FIG. 11, removable personal device 160A is a small physical package that has an edge connector 1110 for interfacing with personal computer 170 and with a docking station in the vehicle. A currently available example of such a removable device is a Memory Stick made by Sony Corporation. In this embodiment, on-board computer uses fixed I/O devices to interface with the operator. The on-board computer downloads data from removable personal device 160A when it is docked in the vehicle or alternatively at run-time when it needs to access data stored in the device.

In another alternative embodiment, the removable device is a cellular telephone that includes an embedded directory or alternatively provides a means of accessing a centralized directory over a wireless link. The on-board computer accesses the directory for determining a navigation destination. For example, the on-board computer may access a telephone number, and the server system that plans a route to the destination performs a reverse directory lookup to determine a street address that corresponds to the telephone number.

In another alternative embodiment, the removable device is a portable gaming device, such as a Nintendo Gameboy. The gaming device optionally includes provision for installing particular application modules which determine the functionality of the gaming device (e.g., a particular game). In such a device, an application module specifically configured for use in conjunction with on on-board computer can optionally be used.

In the embodiments described above, a particular removable personal device is not necessarily always used with the same vehicle. For example, removable personal devices may be supplied to operators that rent automobiles, and the removable devices come from a pool of the devices that may be used in the rental fleet. Also in a rental environment, an operator may dock his or her own personal device into a docking station in a rental vehicle so that he or she may select a destination from a contact database on the personal device.

In yet another embodiment, the data passed from the vehicle to the information server is not necessarily related to travel or navigation. The on-board computer collects data related to the condition of the vehicle and any conditions that require maintenance. For example, the collected data may include any error codes that have been set in the vehicle's control systems. This information is uploaded to the information server that may provide diagnostic information in return, or provide information related to service that is required by the vehicle. In this way, preventive service could be scheduled prior to a major failure. In embodiments in which the vehicle is configurable, for example, with a programmable computer that controls engine drive train functions, the uploaded data from the vehicle can be used by the information server to determine updated configuration data for operation of the vehicle to better match the vehicle's condition or the driving habits of the operator. Data can also be downloaded to the vehicle to update other systems, either based on explicit selection by the operator of through an automated selection mechanism. For example, compressed digitized music can be transported to the vehicle for storage in and use by an embedded entertainment system in the vehicle.

In a scenario that makes use of a removable personal device as described above, the information that is transferred to the removable device and then transported to the on-board computer includes data that identifies the operator of the vehicle. This identification data can then be used by the on-board computer in billing functions. For example, in a rental-car application, the identification data can be used to bill the operator for functions provided by the on-board computer, such as navigation services or other data access services. The data that is downloaded to the vehicle can alternatively include a digital "key" that is used to enable systems in the vehicle, or even to allow the vehicle to be operated without the use of a mechanical key. In another scenario, which may be used in conjunction with downloading identification or key data to the vehicle, data for billing an operator is uploaded to the removable device and transported from the vehicle. In a rental-car application, the data that is uploaded may include information related to the distance traveled, or to other services that were used by the operator while using the vehicle.

It is to be understood that the foregoing description is intended to illustrate and not to limit the scope of the invention, which is defined by the scope of the appended claims. Other embodiments are within the scope of the following claims.

What is claimed is:

1. A vehicle driver information system comprising:
   an on-board computer; and
   a communication interface for removably coupling a portable device to the on-board computer;
   wherein the on-board compute is programmed to selectively access records of a database stored in the portable device that is coupled to the on-board computer through the communication interface, to display information on said portable device, and to accept us inputs from said portable device.

2. The system of claim 1 wherein the communication interface includes a wireless communication interface for communicating between the portable device and the on-board computer over a wireless communication channel.

3. The system of claim 1 wherein the on-board computer is further programmed to access navigation-related information on the portable device in response to user inputs for selecting a travel destination.

4. The system of claim 1 wherein the communication interface includes a mechanical docking station for accepting the portable device.

5. The system of claim 4 wherein the communication interface further includes configurable circuitry for adapting to communication with the portable device.

6. The system of claim 4 wherein the mechanical docking station includes an adjustable portion for adapting to the portable device.

7. The system of claim 1 wherein the on-board computer is programmed to access the information in the portable device without intervention of a user.

8. The system of claim 1 wherein the on-board computer is programmed to access the information in the portable device by communicating with computer program executing on the portable device.

9. A method for vehicle navigation comprising:
   coupling a portable device to an on-board computer, wherein prior to coupling to the on-board computer said portable device includes a database comprising a plurality of records each associated with a corresponding location;
   determining a desired destination, including executing an application on the portable device to selectively access a particular one of the records of the database, and transferring information from said record to the on-board computer;
   determining a route to the corresponding location with which the particular one of the records is associated; and
   guiding the vehicle to the desired destination according to the determined route.

10. The method of claim 9 wherein selectively accessing a particular one of the records of the database includes requesting said particular record by the on-board computer and transferring the information from said record in response.

11. The method of claim 9 wherein the database include a contact database.

12. The method of claim 11 wherein transferring the information from the record includes transferring an address.

13. The method of claim 12 wherein transferring the information from the record includes transferring a telephone number.

14. The method of claim 9 wherein determining the route to the corresponding location includes transmitting the information from the record from the on-board computer to a server system, and receiving the route to the desired destination from the server computer.

15. The method of claim 14 wherein transmitting the information and receiving the route include communicating over a wireless communication network.

16. A method for collecting travel information comprising:
   coupling a portable device to an on-board computer in a vehicle;
   transferring travel-related information from the on-board computer to the portable device, and storing said information in a storage in the portable device;
   removing the portable device from the vehicle and coupling the portable device to a server;
   transferring the travel-related information from the storage in the portable device to the server;
   repeating the previous step multiple times;
   combining the information transferred to the server on different of the repetitions; and
   transferring information from the server to the portable device, said information based on the combining of the travel-related information previously transferred from the portable device to the server.

17. The method of claim 16 wherein repeating the steps includes repeating the steps for a particular operator of a vehicle.

18. The method of claim 17 wherein the travel-related information includes traveled routes and combining the information includes determining travel information related to the traveled routes.

19. The method of claim 18 wherein determining travel information related to the traveled routes includes determining points of interest on said routes.

20. The method of claim 16 wherein repeating the steps includes repeating the steps for a plurality of vehicles.

21. The method of claim 20 wherein combining the information includes determining statistical data.

22. The method of claim 21 further comprising planning a route using the statistical data.

23. The method of claim 16, further comprising determining traveled routes based on the travel-related information transferred to the server on different repetitions, wherein the information sent from the server to the portable device comprises information related to the traveled routes.

24. The method of claim 23 wherein the information transferred from the server to the portable device comprises detailed information related to the traveled routes that were not previously available to the on-board computer.

25. The method of claim 16, further comprising transferring from the portable device to the on-board computer the information previously transferred from the server to the portable device.

26. A vehicle driver information system comprising:

an on-board computer; and a communication interface for removably coupling a portable device to the on-board computer, the communication interface includes a mechanical docking station for accepting the portable device and configurable circuitry for adapting to communication with the portable device;

wherein the on-board computer is programmed to selectively access records of a database stored in the portable device that is coupled to the on-board computer through the communication interface.

27. The system of claim 26 wherein the mechanical docking station includes an adjustable portion for adapting to the portable device.

28. A method comprising:

transferring vehicle-collected travel-related information from an on-board computer in a vehicle to a portable device and transferring the vehicle-collected travel-related information from the portable device to a server;

repeating the previous step at least twice;

processing the vehicle-collected travel-related information transferred to the server on different repetitions; and transferring server-generated travel-related information from the server to the portable device based on the processing of the vehicle-collected travel-related information previously transferred to the server on different repetitions.

29. The method of claim 28 wherein processing the vehicle-collected travel-related information comprises determining a route more frequently traveled by the vehicle.

30. The method of claim 29 wherein the server-generated travel-related information comprises information related to the route more frequently traveled by the vehicle that is more detailed than information previously accessible to the on-board computer.

31. The method of claim 30 wherein the server-generated travel-related information comprises detailed roadway information near the frequently traveled route.

32. The method of claim 28, further comprising transferring the server-generated travel-related information from the portable device to the on-board computer.

* * * * *